United States Patent
Oh et al.

(10) Patent No.: US 11,920,661 B2
(45) Date of Patent: Mar. 5, 2024

(54) VEHICLE TRANSMISSION AND VEHICLE POWERTRAIN DEVICE

(71) Applicant: NEOOTO CO., LTD., Seoul (KR)

(72) Inventors: Se Hoon Oh, Gyeonggi-do (KR); Jae Won Shin, Seoul (KR); Jae Oh Han, Seoul (KR); Sun Hyun Kim, Seoul (KR); Duk Soon Choi, Chungcheongnam-do (KR)

(73) Assignee: NEOOTO CO., LTD., Seoul (KR)

( * ) Notice: Subject to any disclaimer, the term of this patent is extended or adjusted under 35 U.S.C. 154(b) by 217 days.

(21) Appl. No.: 17/426,653

(22) PCT Filed: Apr. 5, 2019

(86) PCT No.: PCT/KR2019/004026
§ 371 (c)(1),
(2) Date: Jul. 29, 2021

(87) PCT Pub. No.: WO2020/184774
PCT Pub. Date: Sep. 17, 2020

(65) Prior Publication Data
US 2022/0107007 A1    Apr. 7, 2022

(30) Foreign Application Priority Data

Mar. 13, 2019    (KR) .................. 10-2019-0028861

(51) Int. Cl.
*F16H 3/66*    (2006.01)
*B60K 1/00*    (2006.01)
(Continued)

(52) U.S. Cl.
CPC .................. *F16H 3/66* (2013.01); *B60K 1/00* (2013.01); *F16H 57/082* (2013.01); *B60K 2001/001* (2013.01); *F16H 57/10* (2013.01)

(58) Field of Classification Search
CPC .......... F16H 3/66; F16H 57/082; F16H 57/10; F16H 2200/201; F16H 3/663;
(Continued)

(56) References Cited

U.S. PATENT DOCUMENTS 5,865,703 A * 2/1999 Shiokawa ............... F16H 37/04
                                                           475/269
6,604,591 B2 * 8/2003 Bowen ..................... B60K 6/52
                                                           903/910
(Continued)

FOREIGN PATENT DOCUMENTS

CN    201795003         4/2011
CN    108194627 A  *    6/2018  ............. F16H 57/02
(Continued)

OTHER PUBLICATIONS

DE 1020 16011263 translation (Year: 2021).*
(Continued)

*Primary Examiner* — Stacey A Fluhart
*Assistant Examiner* — Aimee Tran Nguyen
(74) *Attorney, Agent, or Firm* — JCIPRNET

(57) ABSTRACT

Provided are a vehicle transmission and a vehicle powertrain device including the same. The present disclosure includes a driving sun gear receiving a driving force transmitted from a motor, a first sun gear having the same rotating axis as the driving sun gear, a second sun gear inserted into the first sun gear and having the same rotating axis as the first sun gear, a planetary gear provided with a plurality of stages which respectively mesh with the driving sun gear, the first sun gear, and the second sun gear, and a carrier to which the planetary gear is coupled so as to be rotatable and into which the first sun gear and the second sun gear are inserted.

6 Claims, 7 Drawing Sheets

(51) Int. Cl.
*F16H 57/08* (2006.01)
*F16H 57/10* (2006.01)

(58) Field of Classification Search
CPC ..... F16H 2200/0034; F16H 2200/2035; B60K 1/00; B60K 2001/001
See application file for complete search history.

(56) References Cited

U.S. PATENT DOCUMENTS

| | | | | |
|---|---|---|---|---|
| 7,662,061 | B2* | 2/2010 | Nagao | F16H 3/666 |
| | | | | 475/342 |
| 8,235,859 | B2* | 8/2012 | Yun | B62M 11/145 |
| | | | | 475/290 |
| 9,719,584 | B1* | 8/2017 | Duan | B60K 17/02 |
| 10,480,622 | B2* | 11/2019 | Kim | F16H 3/62 |
| 11,346,439 | B1* | 5/2022 | Langenfeld | F16H 57/082 |
| 2003/0037976 | A1 | 2/2003 | Bowen et al. | |
| 2011/0275477 | A1* | 11/2011 | Hsieh | F16H 1/46 |
| | | | | 475/331 |
| 2018/0172124 | A1* | 6/2018 | Valente | B60K 1/00 |

FOREIGN PATENT DOCUMENTS

| | | | | |
|---|---|---|---|---|
| DE | 10202888 | A1 * | 8/2002 | ........... F16H 37/046 |
| DE | 102016011263 | A1 * | 6/2017 | |
| EP | 2241784 | A2 * | 10/2010 | ............ B62M 11/06 |
| EP | 3266635 | A1 * | 1/2018 | ............... B60K 1/00 |
| JP | H0979327 | A * | 3/1997 | |
| JP | 2017-211079 | | 11/2017 | |
| JP | 2017211079 | A1 * | 11/2017 | |
| KR | 10-1326764 | | 11/2013 | |
| KR | 10-1867537 | | 6/2018 | |

OTHER PUBLICATIONS

JP H0979327 translation (Year: 2021).*
"International Search Report (Form PCT/ISA/210) of PCT/KR2019/004026", dated Dec. 13, 2019, with English translation thereof, pp. 1-4.
"Office Action of Korea Counterpart Application" dated Jun. 27, 2019, with English translation thereof, pp. 1-13.
"Office Action of Korea Counterpart Application" dated Oct. 7, 2019, with English translation thereof, pp. 1-13.
"Notice of Grant of Patent of Korea Counterpart Application" dated Feb. 11, 2020, with English translation thereof, pp. 1-5.

* cited by examiner

VEHICLE TRANSMISSION AND VEHICLE POWERTRAIN DEVICE

TECHNICAL FIELD

The present disclosure relates to a device, and more particularly to, a vehicle transmission and a vehicle powertrain device.

BACKGROUND ART

Electric vehicles refer to environment-friendly vehicles that do not discharge exhaust gas at all by using electricity as their power sources, unlike gasoline or diesel-based vehicles that use gasoline or diesel.

When the existing two-speed transmission of an electric vehicle shifts from first to second gear, since a process of forcibly synchronizing the speed using a synchronizer ring or the like is required for the speed difference between an input axis and an output axis, there is a possibility that a shift shock may occur. Therefore, a higher shift control performance is required to solve the shift shock. In addition, since an electric vehicle transmission is driven by a motor driven by electricity which is a power source of the electric vehicle, it is required to be lightweight and have a more simplified structure.

The existing transmission of the electric vehicle includes three different axis: a motor axis, a planetary gear unit axis, and a differential gear axis, so that existing transmission of the electric vehicle has a large overall volume and is limited to be lightweight. In order to improve the battery efficiency of an electric vehicle, research on a lightweight transmission of a compact size is required.

DESCRIPTION OF EMBODIMENTS

Technical Problem

Provided are a downsized and lightweight vehicle transmission and a vehicle powertrain device including the same. However, this technical problem is merely an example, and the scope of the present disclosure is not limited thereto.

Solution to Problem

According to an aspect of the present disclosure, a vehicle transmission includes a driving sun gear receiving a driving force from a motor; a first sun gear having a same rotating axis as the driving sun gear; a second sun gear inserted into the first sun gear and having a same rotating axis as the first sun gear; a planetary gear comprising a plurality of stages, the plurality of stages respectively meshing with the driving sun gear, the first sun gear, and the second sun gear; and a carrier coupled to rotate the planetary gear and into which the first sun gear and the second sun gear are inserted.

Advantageous Effects of Disclosure

In the vehicle transmission and the vehicle powertrain device including the same according to the present disclosure, since an input axis of a motor and an axis to be shifted form a coaxial axis, the transmission may be downsized and lightweight. Since a driving sun gear is directly connected to the motor, the driving sun gear, a first sun gear, and a second sun gear may form one axis with a rotating axis of the motor. Thereby, the transmission may be downsized and lightweight.

In the vehicle transmission and the vehicle powertrain device including the same according to the present disclosure, since a planetary gear rotates directly by a driving force of the motor and is directly connected to the first sun gear or the second sun gear, the size of the transmission may be minimized and the number of parts may be reduced.

The vehicle transmission 100 and the vehicle powertrain device including the same according to the present disclosure may minimize a power loss occurring during shifting. The power loss may be reduced because the first sun gear and the second sun gear are quickly braked by driving a brake. The scope of the present disclosure is not limited by these effects.

BEST MODE

Figure 1:
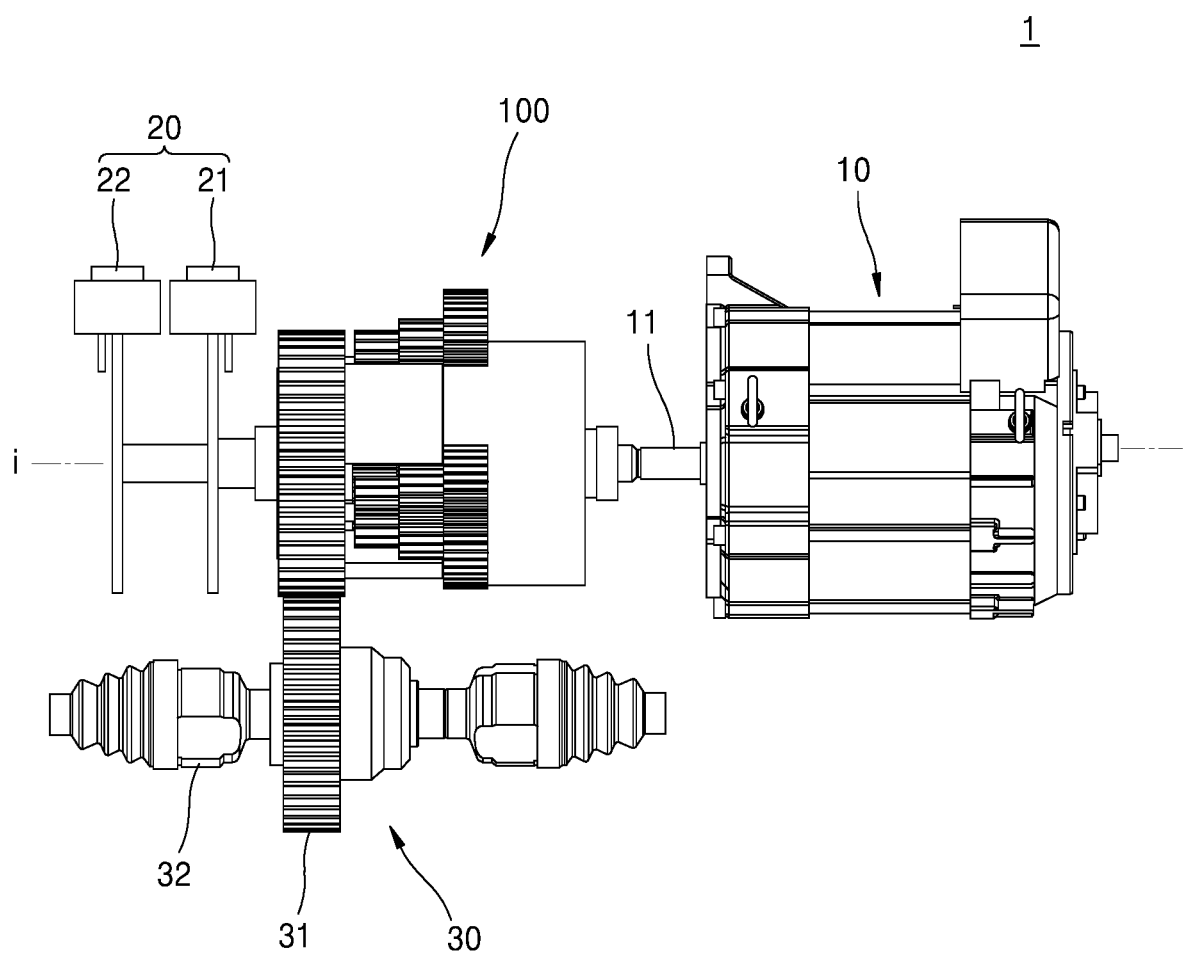
FIG. 1 is a diagram illustrating a vehicle powertrain device according to an embodiment of the present disclosure.

According to an aspect of the present disclosure, a vehicle transmission includes a driving sun gear receiving a driving force from a motor; a first sun gear having a same rotating axis as the driving sun gear; a second sun gear inserted into the first sun gear and having a same rotating axis as the first sun gear; a planetary gear including a plurality of stages, the plurality of stages respectively meshing with the driving sun gear, the first sun gear, and the second sun gear; and a carrier coupled to rotate the planetary gear and into which the first sun gear and the second sun gear are inserted.

The planetary gear may include an input idle gear meshing with the driving sun gear; a first idle gear meshing with the first sun gear; and a second idle gear meshing with the second sun gear.

The second idle gear may be integrally formed with an upper surface of the input idle gear, and the first idle gear may be integrally formed with an upper surface of the second idle gear.

A diameter of the input idle gear may be different from a diameter of the first idle gear or a diameter of the second idle gear.

The vehicle transmission may further include a body assembled with the carrier to support the planetary gear and including an internal space into which the driving sun gear is inserted.

According to another aspect of the present disclosure, a vehicle powertrain device includes a motor, a transmission connected to the motor, a differential device connected to the transmission, and a brake unit braking the transmission, the transmission including a driving sun gear connected to the motor; a first sun gear having a same rotating axis as the driving sun gear; a second sun gear inserted into the first sun gear and having a same rotating axis as the first sun gear; a planetary gear including a plurality of stages, the plurality of stages respectively meshing with the driving sun gear, the first sun gear, and the second sun gear; and a carrier coupled to rotate the planetary gear and into which the first sun gear and the second sun gear are inserted, and wherein the planetary gear rotates when the drive sun gear rotates, and operates the brake unit to selectively brake a rotation of the first sun gear or the second sun gear in a circumferential direction to rotate the carrier.

The planetary gear may include an input idle gear meshing with the driving sun gear; a first idle gear meshing with the first sun gear; and a second idle gear meshing with the second sun gear.

The motor and the transmission may be arranged in a line, and a rotating axis of the motor may be same as a rotating axis of the driving sun gear, a rotating axis of the first sun gear, and a rotating axis of the second sun gear.

These and/or other aspects will become apparent and more readily appreciated from the following detailed description of the embodiments, the accompanying drawings, and claims.

MODE OF DISCLOSURE

Hereinafter, various embodiments of the present disclosure will be described in connection with the accompanying drawings. Because various modifications may be applied and one or more embodiments may be implemented, specific embodiments will be shown in the drawings and described in detail in the detailed description. However, the present embodiments should not be construed as being limited to the specific embodiments set forth herein and should be understood as including all modifications and/or equivalents included in the spirit and scope of the present disclosure. With regard to the description of the drawings, like reference numerals are used to indicate like elements.

It will be understood that the terms "including," "having," and "comprising" used in various embodiments of the present disclosure are intended to indicate the existence of the features, operations, or elements described in the present disclosure, and are not intended to limit the existence of additional one or more features, operations, or elements. Also, it will be understood that the terms "including," "having," and "comprising" in various embodiments of the present disclosure are intended to indicate the existence of features, numbers, steps, operations, elements, and parts, described in the specification, or combinations thereof, and are not intended to preclude the possibility that one or more other features, numbers, steps, operations, elements, and parts, or combinations thereof may exist or may be added.

The expression "or" used herein includes any and all combinations of the features or elements listed together. For example, the expression "A or B" indicates only A, only B, or both A and B.

It will be understood that although the terms "first", "second", etc. may be used herein to describe various elements, these elements should not be limited by these terms. For example, the order and/or importance of the elements are not limited by these terms. These terms may be used to distinguish one element from another. For example, a first user device and a second user device are both user devices and indicate different user devices. Also, a first element may be referred to as a second element, and similarly, the second element may be referred to as the first element, without departing from the scope of rights of the present disclosure.

It will be understood that, when an element is referred to as being "connected" or "coupled" to another element, it may be directly connected or coupled to the other element, or may be connected or coupled to the other element with intervening elements interposed therebetween. In contrast, it will be understood that, when an element is referred to as being "directly connected" or "directly coupled" to another element, there are no intervening elements interposed between the element and the other element.

It should be understood that terms or expressions described herein should be considered in a descriptive sense only and not for purposes of limitation. The singular forms "a," "an," and "the" are intended to include the plural forms as well, unless the context clearly indicates otherwise.

Unless otherwise defined, all terms including technical or scientific terms used herein have the same meaning as commonly understood by those of ordinary skill in the art to which various embodiments of the present disclosure belong.

Terms as those defined in commonly used dictionaries should be construed as having meanings consistent with the meanings in the context of the related technologies, and should not be construed as ideal or excessively formal meanings unless explicitly defined in various embodiments of the present disclosure.

FIG. 1 is a diagram illustrating a vehicle powertrain device 1 according to an embodiment of the present disclosure.

Referring to FIG. 1, the vehicle powertrain device 1 includes a motor 10, a transmission 100, a brake unit 20, and a differential device 30.

The motor 10 and the transmission 100 are arranged in a line to have the same rotating axis. Hereinafter, the rotating axis i is defined to include an axis on which the motor 10 rotates, an axis on which a driving sun gear 110 rotates, an axis on which a first sun gear 150 rotates, and an axis on which a second sun gear 160 rotates.

The motor 10 includes a coupling 11 that transmits power to the transmission 100. The coupling 11 has the same rotating axis i as the driving sun gear 110 of the transmission 100.

The transmission 100 is installed between the motor 10 and the differential device 30, and may perform multi-speed transmission. The transmission 100 may be installed in an electric vehicle as a lightweight driving device. This will be described in detail below.

The brake unit 20 includes a first brake 21 and a second brake 22. The brake unit 20 may brake a sun gear of each stage for the transmission 100 to shift. This will be described in detail below.

The differential device 30 is connected to the transmission 100, and the driving gear 31 rotates to transmit a driving force to tires (not shown) of the vehicle through driving axes 32 disposed on both sides.

Figure 2:
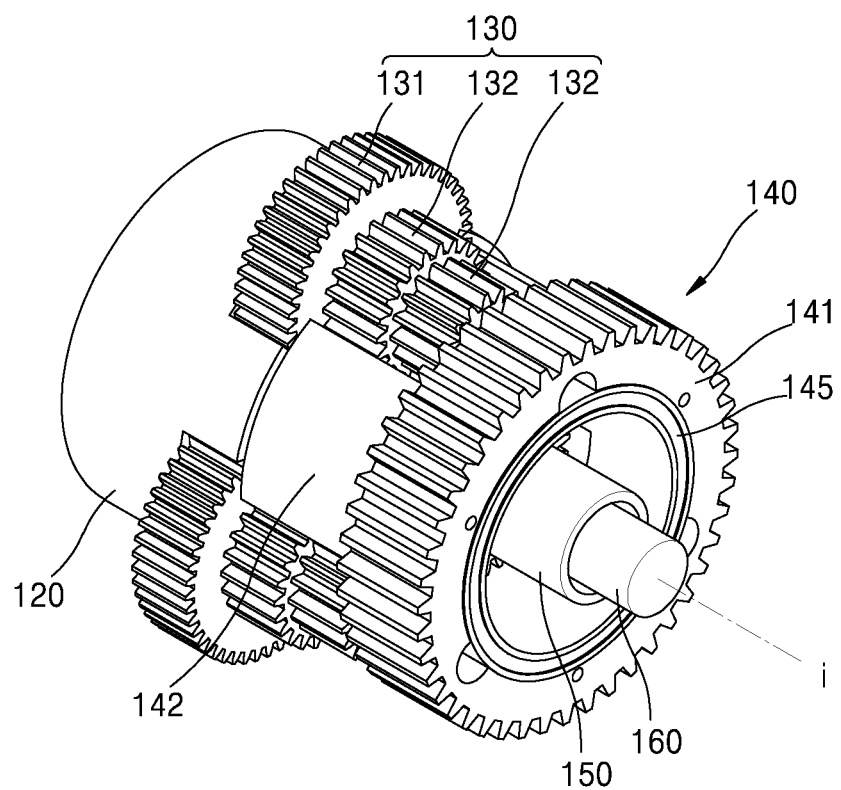
FIG. 2 is a perspective view illustrating a vehicle transmission of FIG. 1.
Figure 3:
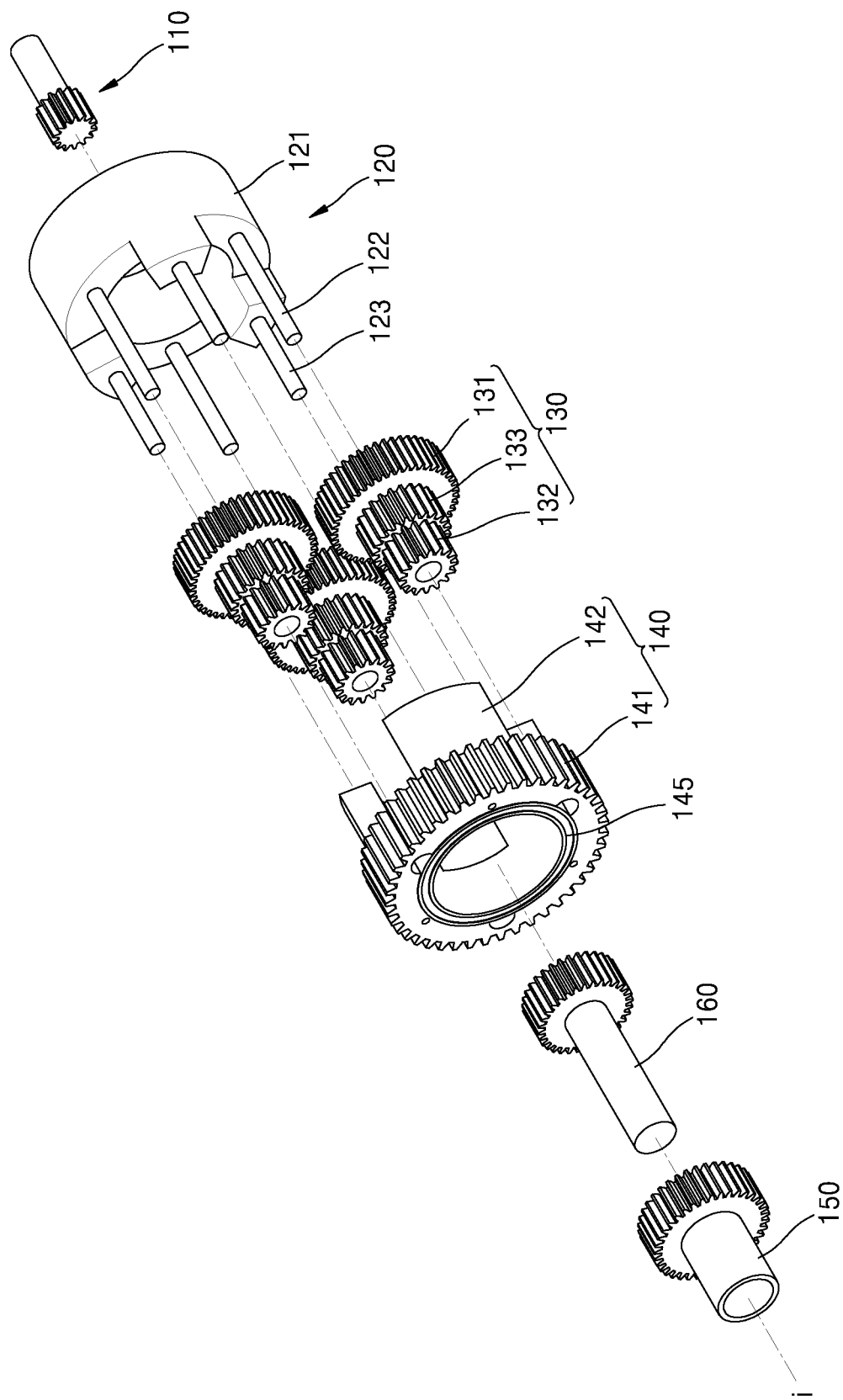
FIG. 3 is an exploded perspective view illustrating the vehicle transmission of FIG.
Figure 4:
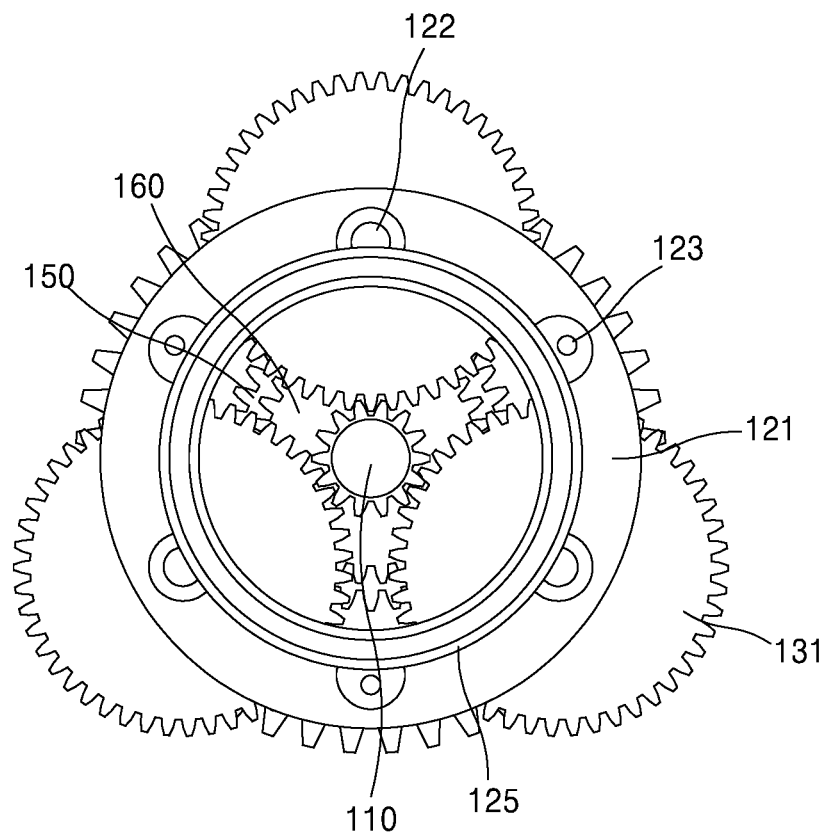
FIG. 4 is a plan view illustrating a part of the vehicle transmission of FIG. 2.
Figure 5:
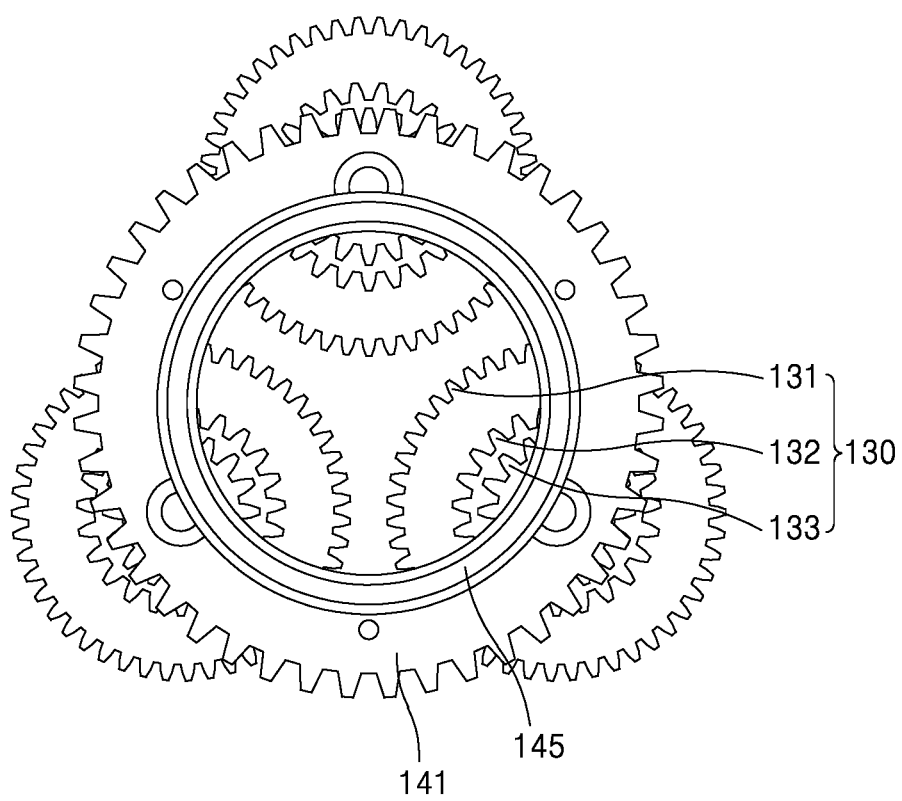
FIG. 5 is a plan view illustrating another part of the vehicle transmission of FIG. 2.

FIG. 2 is a perspective view illustrating the vehicle transmission 100 of FIG. 1, FIG. 3 is an exploded perspective view illustrating the vehicle transmission 100 of FIG. 1, FIG. 4 is a plan view illustrating a part of the vehicle transmission 100 of FIG. 2, and FIG. 5 is a plan view illustrating another part of the vehicle transmission 100 of FIG. 2.

Referring to FIGS. 2 to 5, the vehicle transmission 100 may include the driving sun gear 110, a base 120, a planetary gear 130, a carrier 140, the first sun gear 150, and the second sun gear 160.

The driving sun gear 110 receives a driving force from the motor 10. A rotating axis of the driving sun gear 110 coincides with a rotating axis of the motor 10. Since the rotating axis of the motor 10 and the rotating axis of the transmission 100 are not spaced apart from each other but are coaxial, the motor 10 and the transmission 100 may be installed compactly. In addition, the size of the transmission 100 may be reduced.

The base 120 has an internal space and may have a substantially cylindrical shape. The base 120 may have a circular body 121, a first supporter 122 and a second supporter 123. The base 120 is assembled with the carrier 140 to support the planetary gear 130, and the driving sun gear 110 may be inserted into an inner space thereof.

The body 121 is formed so that one end into which the planetary gear 130 is inserted is cut. The planetary gear 130 may be inserted into and supported by a cut part of the body 121. In particular, an input idle gear 131 may be inserted into the cut part of the body 121. A first bearing 125 is mounted on one side of the body 121 and may be fixed to an external structure.

The planetary gear 130 is inserted into the first supporter 122 so that the planetary gear 130 may rotate with respect to the first supporter 122 as an axis. The first supporter 122 extends from the cut part of the body 121 and is fixed to the carrier 140. The number of first supporters 122 may be provided in plurality according to the number of planetary gears 130, and the plurality of first supporters 122 may be disposed symmetrically to each other.

The second supporter 123 may fix the base 120 to the carrier 140. The second supporter 123 is inserted into and fixed to a bump 142 of the carrier 140. The second supporters 123 are installed between the first supporters 122 and may be provided in plurality.

The planetary gear 130 has a plurality of stages which may mesh with the driving sun gear 110, the first sun gear 150, and the second sun gear 160, respectively. The planetary gear 130 meshes with the driving sun gear 110 to directly receive a driving force. In addition, since the planetary gear 130 meshes with the first sun gear 150 and the second sun gear 160, the received driving force may be directly transferred to the carrier 140.

The number of stages of the planetary gear 130 may be set according to the number of shift stages of the transmission 100. Since a sun gear that the brake unit 20 brakes sets each stage, the number of sun gears may be the same as the number of stages of the planetary gear 130. However, hereinafter, for convenience of description, a case of a two-speed transmission will be mainly described.

The planetary gear 130 may include the input idle gear 131 meshing with the driving sun gear 110, a first idle gear 132 meshing with the first sun gear 150, and a second idle gear 133 meshing with the second sun gear 160. The second idle gear 133 is integrally formed on an upper surface of the input idle gear 131, and the first idle gear 132 is integrally formed on an upper surface of the second idle gear 133. That is, since the input idle gear 131, the first idle gear 132, and the second idle gear 133 form a single body, when the input idle gear 131 rotates, the first idle gear 132 and the second idle gear 133 rotate together. Gear diameters of the input idle gear 131, the first idle gear 132, and the second idle gear 133 may be different from each other.

Since the input idle gear 131 meshes with the driving sun gear 110, the planetary gear 130 may rotate when the driving sun gear 110 rotates. The input idle gear 131 may be installed to be inserted into the base 120. A diameter of the input idle gear 131 may be set to be larger than a diameter of the first idle gear 132 or a diameter of the second idle gear 133. The input idle gear 131 is disposed to protrude from an outer circumferential surface of the base 120, and is disposed to protrude from the output gear 141 of the carrier 140.

The first idle gear 132 is connected to the second idle gear 133, and meshes with the first sun gear 150. The diameter of the first idle gear 132 is smaller than the diameter of the input idle gear 131 or the diameter of the second idle gear 133. When the first sun gear 150 is braked, the first idle gear 132 may rotate the carrier 140 because the first idle gear 132 revolves along the first sun gear 150 with rotation.

The second idle gear 133 is installed between the input idle gear 131 and the first idle gear 132, and meshes with the second sun gear 160. When the second sun gear 160 is braked, the second idle gear 133 may rotate the carrier 140 because the second idle gear 133 revolves along the second sun gear 160 with rotation.

The planetary gear 130 is installed so that the rotating axis i passes through the center. The plurality of planetary gears 130 are disposed on an outer side of the rotating axis i in a circumferential direction. Accordingly, the driving sun gear 110, the first sun gear 150, and the second sun gear 160 are arranged in a line along the rotating axis i, and the driving sun gear 110, the first sun gear 150 and the second sun gear 160 rotate with respect to the same rotating axis.

The planetary gear 130 rotates when the driving sun gear 110 rotates, whereas the brake unit 20 operates to move in a circumferential direction of the first sun gear 150 or the second sun gear 160 to rotate the carrier 140.

The carrier 140 is coupled to the base 120 to form an outer shape of the transmission 100. The carrier 140 is coupled so that the planetary gear 130 rotates, and the first sun gear 150 and the second sun gear 160 are inserted thereinto. The carrier 140 may include an output gear 141 and a bump 142.

The output gear 141 is disposed on an outer circumferential surface of the carrier 140, and meshes with the differential device 30. The output gear 141 transmits an output to the differential device 30 by rotation of the carrier 140.

The bumps 142 may be provided in space between the planetary gears 130 to prevent shaking of the planetary gears 130 and improve durability. In an embodiment, the first idle gear 132 and the second idle gear 133 may be inserted into spaces between the adjacent bumps 142.

A second bearing 145 is mounted on one side of the carrier 140 so that the transmission 100 may be installed in an external structure.

The first sun gear 150 has the same rotating axis as the driving sun gear 110. The first sun gear 150 is disposed outside the second sun gear 160, and the second sun gear 160 is inserted therein. The first idle gear 132 is disposed along a circumferential direction of the first sun gear 150.

The first sun gear 150 meshes with the first idle gear 132. When the first sun gear 150 is fixed by the first brake 21, the first idle gear 132 is driven and connected to the carrier 140.

The second sun gear 160 is inserted into the first sun gear 150, and the second idle gear 133 is disposed along a circumferential direction of the second sun gear 160.

The second sun gear 160 meshes with the second idle gear 133. When the second sun gear 160 is fixed by the second brake 22, the second idle gear 133 is driven and connected to the carrier 140.

The first sun gear 150 and the second sun gear 160 are inserted into the center of rotation of the carrier 140, and when any one of the first sun gear 150 and the second sun gear 160 is braked, the other may be idling.

The driving sun gear 110, the first sun gear 150, and the second sun gear 160 have the same rotating axis. That is, since the driving sun gear 110 driven by the motor 10 and the first sun gear 150 and the second sun gear 160 for shifting form a coaxial axis, the size of the transmission 100 may be reduced and the transmission 100 may be lightweight.

Figure 6:
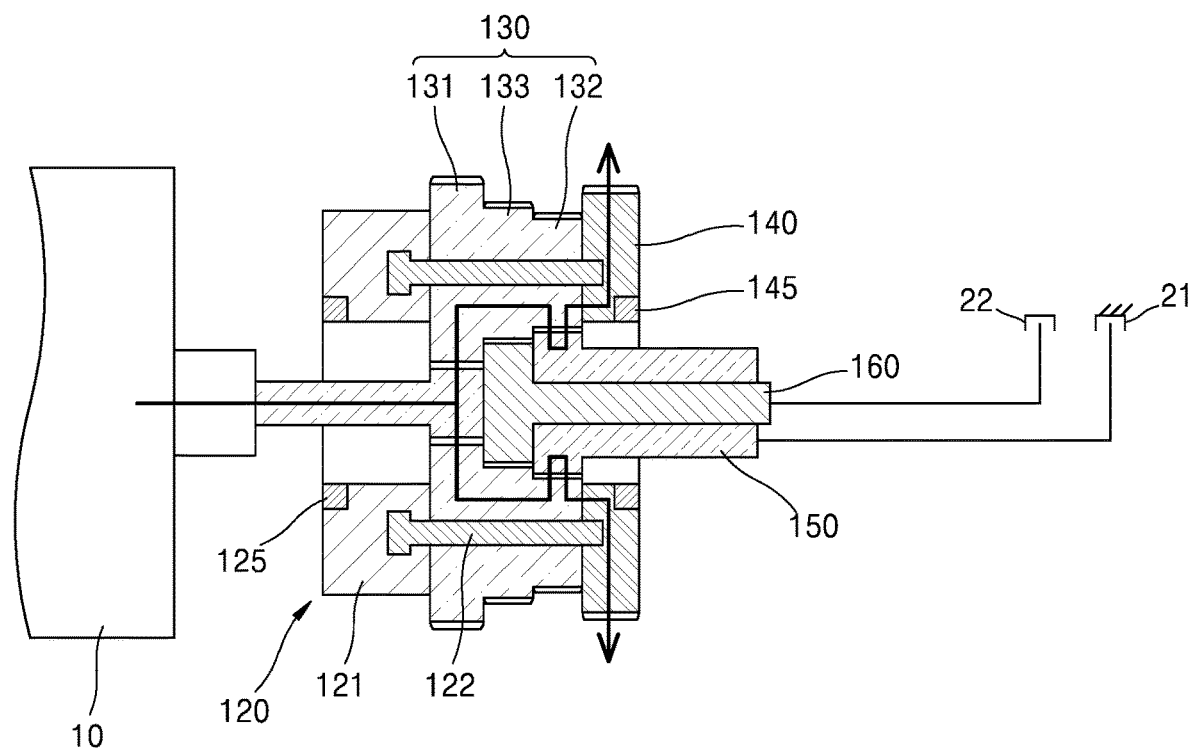
FIG. 6 is a diagram illustrating a first-stage power transmission system of a vehicle transmission according to an embodiment of the present disclosure.
Figure 7:
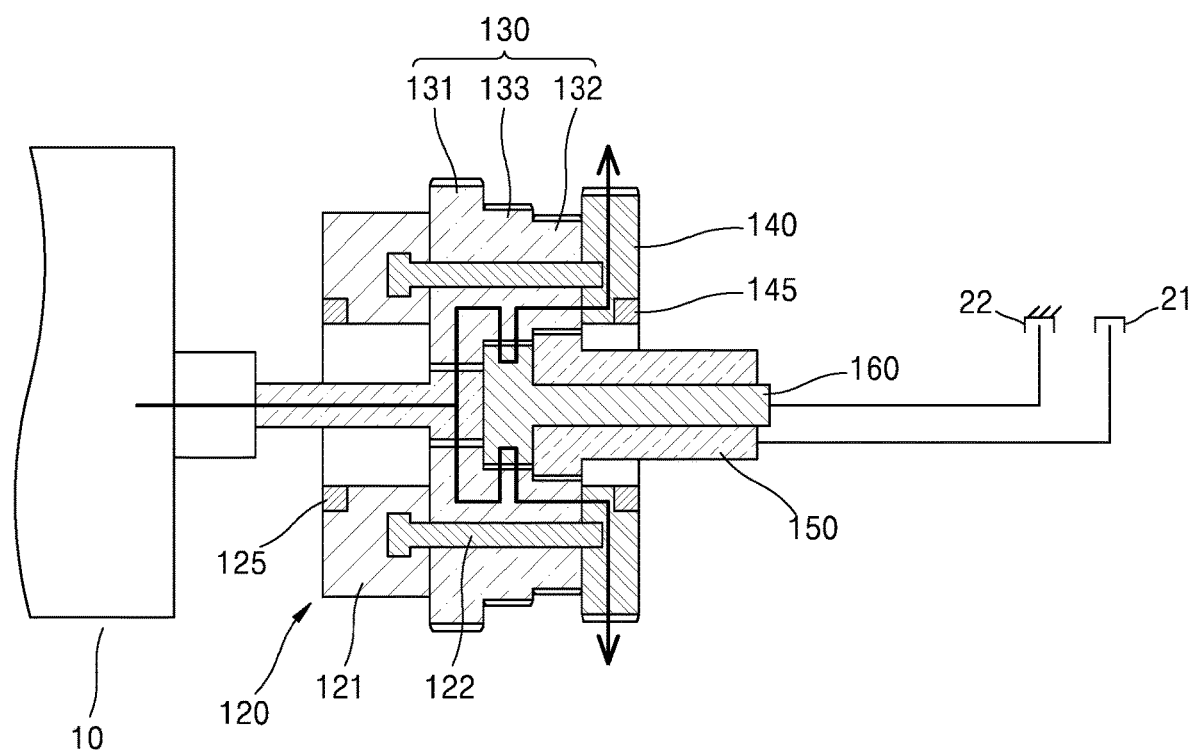
FIG. 7 is a diagram illustrating a second-stage power transmission system of a vehicle transmission according to an embodiment of the present disclosure.

FIG. 6 is a diagram illustrating a first-stage power transmission system of the vehicle transmission 100 according to an embodiment of the present disclosure, and FIG. 7 is a diagram illustrating a second-stage power transmission system of the vehicle transmission 100 according to an embodiment of the present disclosure.

Referring to FIGS. 6 and 7, a shift operation of the vehicle transmission 100 will be described as follows.

<Neutral Mode>

When the brake unit 20 does not break the first sun gear 150 and the second sun gear 160, a neutral mode is realized. Both the first sun gear 150 and the second sun gear 160 are idling.

When the driving sun gear 110 rotates, the planetary gear 130 rotates by the input idle gear 131. However, since the first sun gear 150 and the second sun gear 160 are not braked, the planetary gear 130 does not revolve and thus, the carrier 140 does not rotate.

<First Stage Mode>

When the first brake 21 of the brake unit 20 brakes the first sun gear 150, to first stage mode is realized. The first sun gear 150 is fixed, whereas the second sun gear 160 is idle.

When the driving sun gear 110 rotates, the planetary gear 130 rotates by the input idle gear 131. The second sun gear 160 is not braked and thus idles, and the first sun gear 150 is braked, and thus the first idle gear 132 and the carrier 140 are driven and connected to each other. As an arrow of FIG. 6, a driving force input from the motor 10 is transferred to the driving sun gear 110 and the planetary gear 130. At this time, while the first idle gear 132 rotates and simultaneously revolves in a circumferential direction of the first sun gear 150, the carrier 140 rotates. A first gear ratio is determined according to the number of teeth formed on the first idle gear 132 and the first sun gear 150.

<Second Stage Mode>

When the second brake 22 of the brake unit 20 brakes the second sun gear 160, the second stage mode is realized. The second sun gear 160 is fixed, whereas the first sun gear 150 is idle.

When the driving sun gear 110 rotates, the planetary gear 130 rotates by the input idle gear 131. The first sun gear 150 is not braked and thus idles, and the second sun gear 160 is braked, and thus the second idle gear 133 and the carrier 140 are driven and connected to each other. As an arrow of FIG. 7, the driving force input from the motor 10 is transferred to the driving sun gear 110 and the planetary gear 130. At this time, the second idle gear 133 rotates and simultaneously revolves in a circumferential direction of the second sun gear 160, and the carrier 140 rotates. A second gear ratio is determined according to the number of teeth formed on the second idle gear 133 and the second sun gear 160.

In the related art, since a motor is connected to the outside of a transmission, a rotating axis of the motor and a rotating axis of the transmission do not coincide. That is, since a drive axis of the motor, the rotating axis of the transmission, and a drive axis of a differential are separately disposed, a considerable space is required for installation. In addition, since the transmission must include a gear for receiving power from the motor, the size and the weight of the transmission increase.

In addition, the transmission of the related art is shifted using a plurality of planetary gears. Since a planetary gear receiving a driving force from the motor and a planetary gear connected to a sun gear for shifting are installed separately from each other, there are limitations in that the size and weight of the transmission increase for the arrangement of the planetary gears.

In the vehicle transmission 100 and the vehicle powertrain device 1 including the same according to the present disclosure, the input axis in the motor 10 and the axis to be shifted form a coaxial, and thus the transmission 100 may be downsized and lightweight. Since the driving sun gear 110 is directly connected to the motor 10, the driving sun gear 110, the first sun gear 150, and the second sun gear 160 may form a single axis with the rotating axis of the motor 10. Thereby, the transmission 100 may be downsized and lightweight.

In particular, in the vehicle transmission 100 and the vehicle powertrain device 1 including the same according to the present disclosure, the planetary gear 130 directly rotates with the driving force of the motor 10, and is directly driven and connected to the first sun gear 150 or the second sun gear 160, and thus the size of the transmission 100 may be minimized and the number of parts may be reduced.

The vehicle transmission 100 and the vehicle powertrain device 1 including the same according to the present disclosure may minimize power loss occurring during shifting. The power loss may be reduced because the first sun gear 150 and the second sun gear 160 are quickly braked by driving the brake.

As described above, the present disclosure has been described with reference to the embodiments shown in the drawings, which are merely examples, and those skilled in the art will understand that various modifications and equivalent other embodiments are possible therefrom. Therefore, the true technical protection scope of the present disclosure should be determined by the technical spirit of the appended claims.

INDUSTRIAL APPLICABILITY

The present disclosure may be applied to industrially available vehicle transmissions and vehicle powertrain devices.

The invention claimed is:

1. A vehicle transmission comprising:

a driving sun gear receiving a driving force from a motor;

a first sun gear having a same rotating axis as the driving sun gear;

a second sun gear inserted into the first sun gear and having a same rotating axis as the first sun gear;

a plurality of planetary gears comprising a plurality of stages, the plurality of stages respectively meshing with the driving sun gear, the first sun gear, and the second sun gear;

a carrier coupled to rotate a planetary gear and into which the first sun gear and the second sun gear are inserted; and
a base coupled to the carrier,
wherein the carrier comprises:
an output gear disposed on an outer circumferential surface of the carrier and meshing with a differential device; and
a plurality of bumps extending toward the motor in a circumferential direction,
wherein the planetary gear comprises:
a plurality of input idle gears meshing with the driving sun gear;
a plurality of first idle gears meshing with the first sun gear; and
a plurality of second idle gears meshing with the second sun gear,
wherein the base comprises:
a body in which a plurality of cut parts where the plurality of planetary gears is seated respectively, and a plurality of protrusions adjacent to the plurality of cut parts are repeatedly disposed on the upper surface thereof;
a plurality of first supporters fixed on the plurality of cut parts respectively and into which the plurality of planetary gears is inserted; and
a plurality of second supporters fixed on the plurality of the bumps respectively,
wherein the input idle gear is disposed between the plurality of protrusions,
wherein the first idle gear and the second idle gear are disposed between the bumps,
wherein a length in the circumferential direction of the bumps is longer than a length in the circumferential direction of the protrusions,
wherein a diameter of the input idle gear is greater than diameters of the first idle gear and the second idle gear.

2. The vehicle transmission of claim 1, wherein the second idle gear is integrally formed with an upper surface of the input idle gear, and the first idle gear is integrally formed with an upper surface of the second idle gear.

3. The vehicle transmission of claim 1, wherein a diameter of the input idle gear is different from a diameter of the first idle gear or a diameter of the second idle gear.

4. The vehicle transmission of claim 1, further comprising a body assembled with the carrier to support the planetary gear and comprising an internal space into which the driving sun gear is inserted.

5. A vehicle powertrain device comprising a motor, a transmission connected to the motor, a differential device connected to the transmission, and a brake unit braking the transmission, wherein the transmission comprises:
a driving sun gear connected to the motor;
a first sun gear having a same rotating axis as the driving sun gear;
a second sun gear inserted into the first sun gear and having a same rotating axis as the first sun gear;
a planetary gear comprising a plurality of stages, the plurality of stages respectively meshing with the driving sun gear, the first sun gear, and the second sun gear;
a carrier coupled to rotate the planetary gear and into which the first sun gear and the second sun gear are inserted, and
a based coupled to the carrier,
wherein the planetary gear rotates when the drive sun gear rotates, and operates the brake unit to selectively brake a rotation of the first sun gear or the second sun gear in a circumferential direction to rotate the carrier,
wherein the carrier comprises:
an output gear disposed on an outer circumferential surface of the carrier and meshing with a differential device; and
a plurality of bumps extending toward the motor in a circumferential direction,
wherein the planetary gear comprises:
a plurality of input idle gears meshing with the driving sun gear;
a plurality of first idle gears meshing with the first sun gear; and
a plurality of second idle gears meshing with the second sun gear,
wherein the base comprises:
a body in which a plurality of cut parts where a plurality of planetary gears is seated respectively, and a plurality of protrusions adjacent to the plurality of cut parts are repeatedly disposed on the upper surface of thereof;
a plurality of first supporters fixed on the plurality of cut parts respectively and into which the plurality of planetary gears is inserted; and
a plurality of second supporters fixed on the plurality of the bumps respectively,
wherein the input idle gear is disposed between the plurality of protrusions,
wherein the first idle gear and the second idle gear are disposed between the bumps,
wherein a length in the circumferential direction of the bumps is longer than a length in the circumferential direction of the protrusions,
wherein a diameter of the input idle gear is greater than diameters of the first idle gear and the second idle gear.

6. The vehicle powertrain device of claim 5,
wherein the motor and the transmission are arranged in a line,
and wherein a rotating axis of the motor is same as a rotating axis of the driving sun gear, a rotating axis of the first sun gear, and a rotating axis of the second sun gear.

* * * * *